United States Patent
Steiner et al.

(10) Patent No.: US 9,742,737 B2
(45) Date of Patent: Aug. 22, 2017

(54) AUTHENTICATED TIME-OF-FLIGHT INDOOR POSITIONING SYSTEMS AND METHODS

(71) Applicants: Itai Steiner, Petach Tikva (IL); Jonathan Segev, Tel Mond (IL)

(72) Inventors: Itai Steiner, Petach Tikva (IL); Jonathan Segev, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,401

(22) PCT Filed: Sep. 25, 2013

(86) PCT No.: PCT/US2013/061539
§ 371 (c)(1),
(2) Date: Dec. 18, 2013

(87) PCT Pub. No.: WO2015/047234
PCT Pub. Date: Apr. 2, 2015

(65) Prior Publication Data
US 2015/0222602 A1  Aug. 6, 2015

(51) Int. Cl.
*H04L 9/32* (2006.01)
*H04L 29/06* (2006.01)
(Continued)

(52) U.S. Cl.
CPC ........ *H04L 63/0428* (2013.01); *G01S 5/0205* (2013.01); *G01S 5/14* (2013.01);
(Continued)

(58) Field of Classification Search
CPC ... H04L 63/0823; H04L 9/0825; H04L 51/38; H04L 63/06; H04L 9/0822; H04L 9/3263; G01S 2013/466; G01S 5/14; G01S 13/767
(Continued)

(56) References Cited

U.S. PATENT DOCUMENTS 8,909,244 B2 * 12/2014 Curticapean .......... H04W 64/00
455/456.1
2005/0251401 A1 * 11/2005 Shuey .................... G06Q 50/06
705/412
(Continued)

FOREIGN PATENT DOCUMENTS

WO    2010129589    11/2010

OTHER PUBLICATIONS

International Search Report and Written Opinion received for PCT Patent Application No. PCT/US2013/061539, mailed on Jun. 16, 2014, 12 pages.
(Continued)

*Primary Examiner* — Farid Homayounmehr
*Assistant Examiner* — Lizbeth Torres-Diaz
(74) *Attorney, Agent, or Firm* — Eversheds Sutherland (US) LLP

(57) ABSTRACT

This disclosure describes systems, methods, and computer-readable media related to testing tools for devices. In some embodiments, a plurality of public keys may be received from a server via a secured network connection where each of the plurality of keys corresponds to a respective private key associated with an access point. A time-of-flight (ToF) measurement protocol may be initiated with one or more access points. Data generated by ToF measurement protocol with the one or more access points may be received. In some embodiments, the one or more access points may be authen-
(Continued)

ticated based at least in part on the plurality of public keys. A location of a user device may be determined based at least in part on the received data.

18 Claims, 5 Drawing Sheets

(51) Int. Cl.
| | |
|---|---|
| *G01S 5/02* | (2010.01) |
| *G01S 5/14* | (2006.01) |
| *H04W 12/04* | (2009.01) |
| *H04W 64/00* | (2009.01) |
| *H04W 12/06* | (2009.01) |
| *G01S 13/76* | (2006.01) |
| *G01S 13/87* | (2006.01) |
| *H04K 3/00* | (2006.01) |

(52) U.S. Cl.
CPC .......... *G01S 13/767* (2013.01); *G01S 13/878* (2013.01); *H04K 3/22* (2013.01); *H04K 3/65* (2013.01); *H04K 3/90* (2013.01); *H04W 12/04* (2013.01); *H04W 12/06* (2013.01); *H04W 64/003* (2013.01); *H04K 2203/18* (2013.01)

(58) Field of Classification Search
USPC .................................................. 713/160, 168
See application file for complete search history.

(56) References Cited

U.S. PATENT DOCUMENTS

| | | | |
|---|---|---|---|
| 2008/0254833 A1* | 10/2008 | Keevill | H04L 12/5692 455/558 |
| 2008/0258973 A1 | 10/2008 | Heidari-Bateni et al. | |
| 2010/0150117 A1* | 6/2010 | Aweya | G01S 5/14 370/338 |
| 2010/0199296 A1 | 8/2010 | Lee et al. | |
| 2011/0320539 A1* | 12/2011 | Zhao | G06Q 30/0251 709/206 |
| 2012/0182180 A1 | 7/2012 | Wolf et al. | |
| 2012/0210130 A1* | 8/2012 | Buer | H04L 63/068 713/168 |
| 2012/0221853 A1 | 8/2012 | Wingert et al. | |
| 2013/0307723 A1* | 11/2013 | Garin | H04W 64/003 342/357.29 |
| 2013/0336287 A1* | 12/2013 | Abraham | H04W 36/0061 370/331 |
| 2014/0187259 A1* | 7/2014 | Kakani | H04W 64/00 455/456.1 |
| 2016/0044524 A1* | 2/2016 | Ben-Haim | G01S 5/14 370/252 |

OTHER PUBLICATIONS

Office Action for Korean Patent Application No. KR 2016-7004880, mailed Dec. 16, 2016, 10 pages (5 pages English translation).
Supplementary European Search Report for European Application No. 13894595.1, dated May 11, 2017, 8 pages.

* cited by examiner

AUTHENTICATED TIME-OF-FLIGHT INDOOR POSITIONING SYSTEMS AND METHODS

CROSS-REFERENCE TO RELATED APPLICATIONS

This nonprovisional application, U.S. patent application Ser. No. 14/127,401, entitled AUTHENTICATED TIME-OF-FLIGHT INDOOR POSITIONING SYSTEMS AND METHODS, filed on Dec. 18, 2013, which claims the benefit of International Application No. PCT/US2013/061539, filed on Sep. 25, 2013, the disclosures of which are both incorporated herein by reference and set forth in full.

BACKGROUND

Due to the signal attenuation caused by construction materials, Global Positioning Systems (GPS) may be inaccurate when attempting to locate objects or devices indoors. An indoor positioning system (IPS) is a network of wireless devices that may be used to locate objects and people inside at limited area, such as within a building. In some embodiments, an IPS may be vulnerable to spoofing attacks. For example, if an IPS is based on tracking the identity of the devices in an IPS, such as by using a MAC address for each device, then a user may spoof the identity of an access point (e.g., user and/or program is able to masquerade as another access point by falsifying data such as the MAC address) thereby resulting in inaccurate location information. If the IPS is used in conjunction with asset tracking, documents rights accessibility, or the like, a spoof attack may result in bypassing the location-based services and/or protection.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
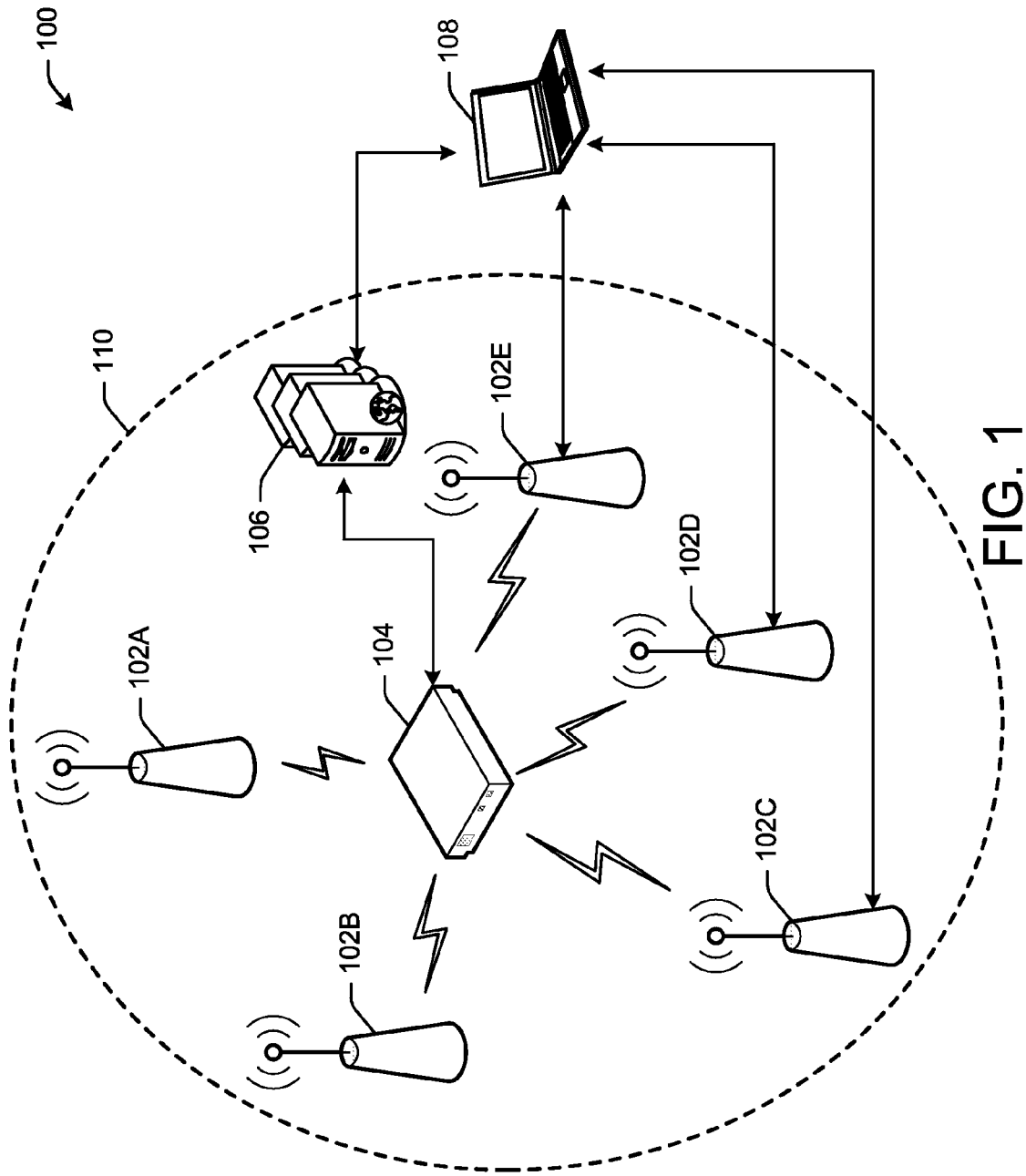
FIG. 1 depicts an illustrative data flow between various components of an illustrative system architecture for an authenticated time-of-flight indoor positioning system in accordance with one or more embodiments of the disclosure.

This disclosure relates to, among other things, systems, methods, computer-readable media, techniques and methodology an authenticated time-of-flight (ToF) indoor positioning system (IPS). As an illustrative example, an authenticated ToF IPS may provide accurate measurements for locations of objects and/or people within an area, such as a building. An authenticated ToF IPS may be used for asset tracking, document rights accessibility, and so forth. An authenticated ToF IPS may curb inaccurate measurements by preventing spoofing of access points to deriving false location information.

In some embodiments, an authenticated ToF IPS may include multiple access points, an IPS appliance, a ToF security server, and a user device. The access points may be in communication with an IPS appliance, which may manage the one or more access points. The IPS appliance and/or the access points may be in communication with the ToF security server. The ToF security server may be in communication with one or more user devices. In order to determine a location of the user device, the user device may communicate with one or more access points to obtain ToF measurement data and calculate a location.

The ToF security server may generate public-private secret key pairings for each access point. The public-private secret-key pairings may be generated using the identity of an access point, such as a MAC address. This ensures that the public-private secret-key pairing is unique to the particular access point. The ToF security server may establish a secure connection with each access point and transmit the respective private keys to each of the access points. In some embodiments, the public-private secret-key pairings may expire after a pre-determined time period. The ToF security server may track the expiration times associated with each public-private secret-key pairing and may generate new public-private secret keys-pairings to ensure all active access points have a current private key.

The access points may receive the private keys from frown the ToF security server and may use the private keys in conjunction with the ToF measurement protocols with user devices. In some embodiments, the private keys may be transmitted to each of the access points in the form of digital signatures that include the private key.

A user device may request public keys from the ToF security server. The ToF security server may act as a certificate authority and may issue digital certificates that may include a public key corresponding to a private key associated with an access point. The ToF security server may transmit one or more digital certificates to the user device in response to receiving a request.

The user device may initiate a ToF measurement protocol where the user device may exchange messages or ToF measurement frames with one or more access points. The user device may obtain timing data throughout the ToF measurement protocol and based on the data, may calculate as location of the user device. In some embodiments, the user device may receive location data associated with one or more access points from the ToF security server.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases And System Architecture

FIG. 1 depicts an illustrative architecture 100 of various components of an authenticated time-of-flight (ToF) indoor positioning system (IPS) in accordance with one or more embodiments of the disclosure. One or more illustrative access point(s) 102A-102E (collectively referred to as 102) are illustratively depicted in FIG. 1. Access point(s) 102 may be in communication with an IPS appliance 104. The IPS appliance 104 may be in communication with a ToF security server 106. In some embodiments, the IPS appliance 104 may be in communication with the ToF security server 106 over a secured network connection, which may include but is not limited to, a secured socket, HTTPS, TLS/SSL, or the like. The ToF security server 106 may be in communication with one or more user device(s) 108. In some embodiments, the ToF security server 106, IPS appliance 104, and/or the one or more access point(s) 102 may reside within a trusted network 110. The trusted network 110 may include device(s) (e.g., ToF security server 106, IPS appliance 104, and/or one or more access point(s) 102) to be connected via secured connections, secure tunnel, secure transport layer, or the like. In some embodiments, the connections between the access point(s) 102 and the ToF security server 106 may be password/authentication based. The trusted network 110 may be managed or deployed by a network administrator and/or network owner.

The one or more access point(s) 102 may be located within a coverage area specified by the IPS. Each access point 102 may be configured with a unique identifier (e.g., MAC address). Access point(s) 102 may be configured to receive private keys from a ToF security server 106 and to communicate with one or more user device(s) 108. A location may be determined by the user device 108 based at least in part on information received from the one or more access point(s) 102. In some embodiments, the location may be determined based at least in part on the data received from the one or more access points 102 as well as location data associated with each of the access point 102. The location data may be received by the user device 108 from a ToF security server 106.

The one or more IPS appliance(s) 104 may include any suitable device for managing one or more IPS access point(s) 102. For ease of explanation, the IPS appliance(s) 104 may be described herein in the singular; however, it should be a appreciated that multiple us IPS appliance(s) 104 may be provided. In some embodiments, the IPS appliance 104 may be a wireless LAN controller, a WiFi provider, a wireless local area network provider, or the like.

The ToF security server 106 may include any suitable processor-driven computing device, including, but not limited to, a desktop computing device, a laptop computing device, a server, and so forth. For each of explanation, the ToF security server 106 may be described herein in the singular; however, it should be appreciated that multiple ToF security servers 106 may be provided.

The ToF security server 106 may generate and issue for each access point 102 a unique public-provide secret-key pair. In some embodiments, the secret keys may be based at least in part on the unique identity of the access point 102, such as a MAC address or a basic service set identification (BSSID). In some embodiments, the ToF security server 106 may act as a Certificate Authority (CA) for the public keys. The ToF security server 106 may transmit the generated private key to the access point 102 over a secured network connection. The ToF security server 106 may transmit the corresponding public key to a user device 108. In some embodiments, the ToF security server 106 may reside in a cloud computing environment, enabling secure connection to access point(s) 102 and/or user device(s) 108. In some embodiments, the ToF security server 106 may receive and/or otherwise securely obtain location information associated with one or more access points 102 (e.g., location of the access point 102). The user device 108 may securely obtain (e.g., over a secure connection) the location information associated with the one or more access points 102 from the ToF security server 106, the one or more access points 102, or another entity.

The user device(s) 108 may include any suitable processor-driven computing device, including, but not limited to, tablet computing devices, electronic book (e-book) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. For ease of explanation, the user device(s) 108 may be described herein in the singular; however, it should be appreciated that multiple user device(s) 104 may be provided.

The user device 104 may obtain one or more public keys from the ToF security server 106. The user device 104 may then initiate a ToF time measurement protocol with one or more access point(s) 102 associated with the IPS. Details of an example embodiment of a ToF measurement protocol will be discussed in relation to FIG. 3.

Figure 2:
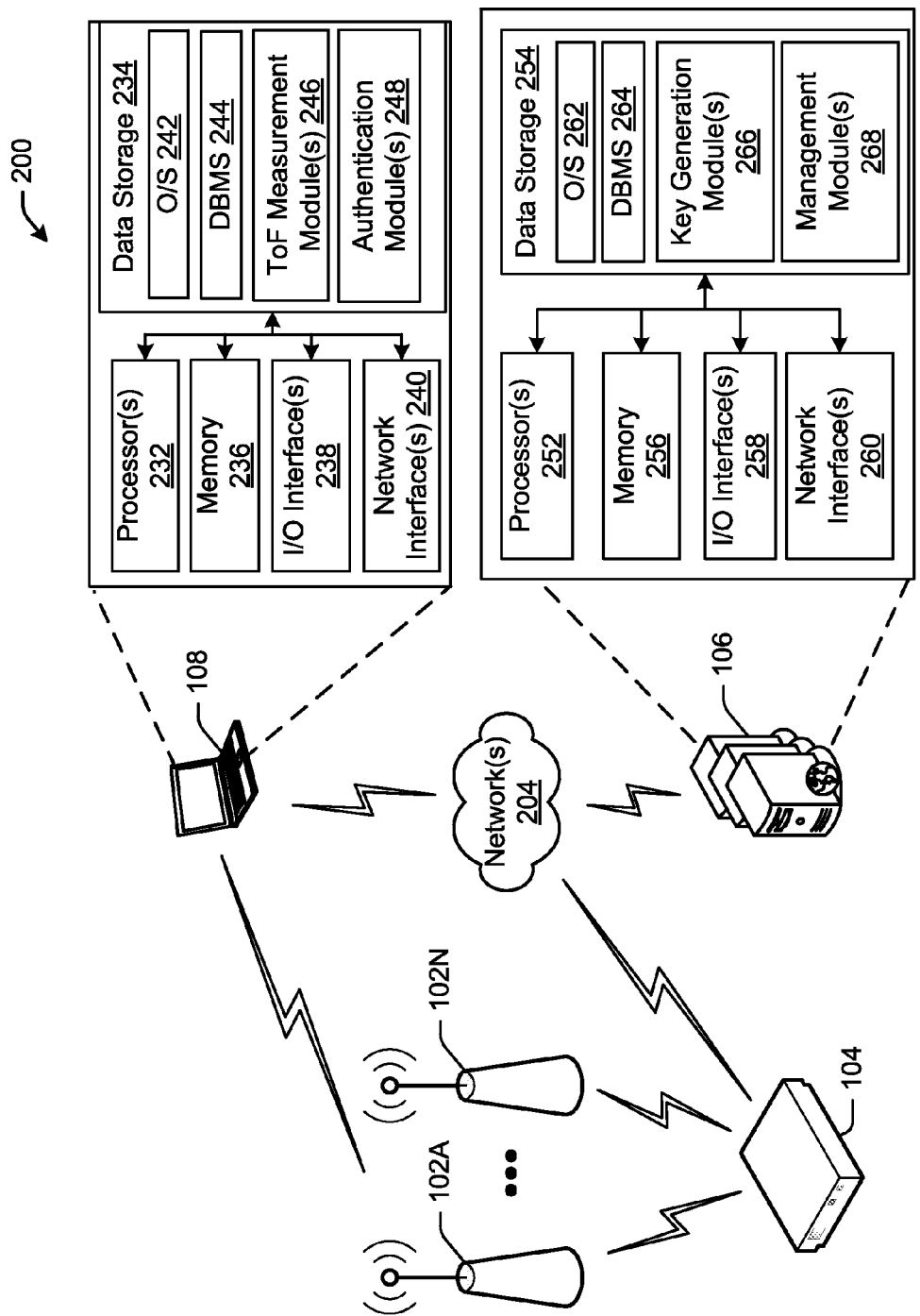
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more access point(s) 102, one or more IPS appliance(s) 104, one or more ToF security server(s) 106, and/or one or more user device(s) 108. The access point(s) 102 may include any of the types of devices described through reference to FIG. 1. The IPS appliance(s) 104 may include any of the types of devices described through reference to FIG. 1. The ToF security server(s) 106 may include any of the types of devices described through reference to FIG. 1. The user device(s) 108 may include any of the types of devices described through reference to FIG. 1.

Any of the access point(s) 102, IPS appliance(s) 104, ToF security server(s) 106, and/or user device(s) 108 may be configured to communicate with each other and any other component of the architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private, and/or public networks. Further, the network(s) 204 may have any suitable communication range associated therewith and may include, for example, global networks (e.g., the Internet), metropolitan area networks (MANs), wide area networks (WANs), local area networks (LANs), wireless personal area networks (WPANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Any of the access point(s) 102, IPS appliance(s) 104, ToF security server(s) 106, and/or user device(s) 108 may include one or more communications antennae. Communications antenna may be any suitable type of antenna corresponding to the communications protocols used by the access point(s) 102, IPS appliance(s) 104, ToF security server(s) 106, and/or user device(s) 108. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 108.

Any of the access point(s) 102, IPS appliance(s) 104, ToF security server(s) 106, and/or user device(s) 108 may include transmit/receive (transceiver) or radio components may include any suitable radio and/or transceiver for transmitting and/or receiving radio frequency (RF) signals in the bandwidth and/or channels corresponding to the communications protocols utilized by any of the access point(s) 102, IPS appliance(s) 104, ToF security server(s) 106, and/or user device(s) 108 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz, channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The user device(s) 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from data storage 234 and loaded into memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by processor(s) 232, as well as data manipulated and generated by the processor(s) 232 during execution of the program instructions. The program instruction may be loaded into memory 236 as needed for execution. Depending on the configuration and implementation of the user device(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 108 may further include network interface(s) 240 that facilitate communication between the user device(s) 108 and other devices of the illustrative system architecture 200 (e.g., ToF security server(s) 106, etc.) or application software via the network(s) 204. The user device(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, at touch input device, a display, speakers, a camera, a microphone, a printer, and so forth.

Referring again to the data storage 234 various program modules, applications, or the like, may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, as browser application, a web-based application, a distributed client-server application, etc.) executing on the user device 108 and the hardware resources of the user device 108. More specifically, the O/S 242 may include a set of computer-executable instructions for managing the hardware resources of the user device(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more ToF measurement module(s) 246 and/or one or more authentication module(s) 248.

The ToF measurement module(s) 246 may include computer-executable instructions that in response to execution by the processor(s) 232 cause operations to be performed including generating and receiving fine timing measurement frames (e.g., messages) for the ToF measurement protocol. The ToF measurement module(s) 246 may generate a token, which may be a randomly-generated number and include the token in a fine timing measurement frame to an access point 102. The ToF measurement module 246 may receive acknowledgment frames as well as response frames. The response frames may include the token or at derivation of the token, timers and/or timestamps indicating time of arrival of the initial frame at the access point 102 and the time of departure of a response frame from the access point 102. The response frame may also be signed (e.g., include a private key) by the access point 102. The ToF measurement module 246 may use the information received from the access point 102 (e.g., timers and/or time stamps associated with arrivals and departures of frames) to determine a location of the user device 108.

The authentication module(s) 248 may include computer-executable instructions that in response to execution by the processor(s) 232 cause operations to be performed including generating a message to a ToF security server 106 requesting one or more public keys associated with one or more access points 102 in the authenticated ToF IPS. The authentication module 248 may receive the requested public keys from the ToF security server 106. In some embodiments, the authentication module 248 may authenticate the identity of the access points 102 during or after the ToF measurement protocol, where the authentication module 248 may verify the identify the access point 102 based at least in part on the private key received from the access point 102 and the public key received from the ToF security server 106. In some embodiments, the authentication module 248 may utilize one or more standard digital signature algorithms, which may include but are not limited to the Elliptic Curve Digital Signature Algorithm and/or the Digital Signature Algorithm.

Within the data storage 234, one or more modules may be stored. As used herein, the term module may refer to a functional collection of instructions that may be executed by the one or more processors 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The ToF security server(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from data storage 254 and loaded into memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into memory 256 as needed for execution. Depending on the configuration and implementation of the ToF security server(s) 106, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The ToF security server(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The ToF security server(s) 106 may further include network interface(s) 260 that facilitate communication between the ToF security server 106 and other devices of the illustrative system architecture 200 (e.g., user device(s) 108, etc.) or application software via the network(s) 204. The ToF security server(s) 106 may additionally include one or more input/output (110) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like, may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the ToF security server(s) 106 and the hardware resources of the ToF security server(s) 106.

More specifically, the O/S 262 may include a set of computer-executable instructions for managing the hardware resources of the ToF security server(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more key generation module(s) 266 and/or one or more management module(s) 268.

The key generation module(s) 266 may include computer-executable instructions that in response to execution by the processor(s) 252 cause operations to be performed including generating public-private secret-keys and associated as unique pair to each access point 102 of the authenticated ToF IPS. The public-private secret keys may be generated using any protocols known in the art, which may include but are not limited to GNU Privacy Guard, Internet Key Exchange, and the like. In some embodiments, the public-private secret keys may be generated based at least in part on the identity of the access point 102 such as a MAC address and/or BSSID associated with the access point 102.

The management module(s) 268 may include computer-executable instructions that in response to execution by the processor(s) 252 cause operations to be performed including receiving the public-private secret keys generated by the key generation module 266 and maintaining and/or updating associations of the public-private secrets keys, access points 102, and/or user devices 108. In some embodiments, the public-private secret keys may be set to expire after a pre-determine time period. The management module 268 may track the expiration of public-private secret keys and communicate with the key generation module 266 to generate new keys and transmit them to the appropriate devices. In some embodiments, the management module 268 may establish a secure connection with each access point 102 and transmit the private key associated with the access point 102 to the access point 102. The management module 268 may receive requests from user devices 108 for public keys. The management module 268 may authenticate the user device 108 via a username/password authentication and then transmit one or more public keys to the user device 108 responsive to the request.

Within the data storage 254, one or more modules may be stored. As used herein, the term module may refer to a functional collection of instructions that may be executed by the one or more processors 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 200, and the associated functionality that such components support, are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Figure 3:
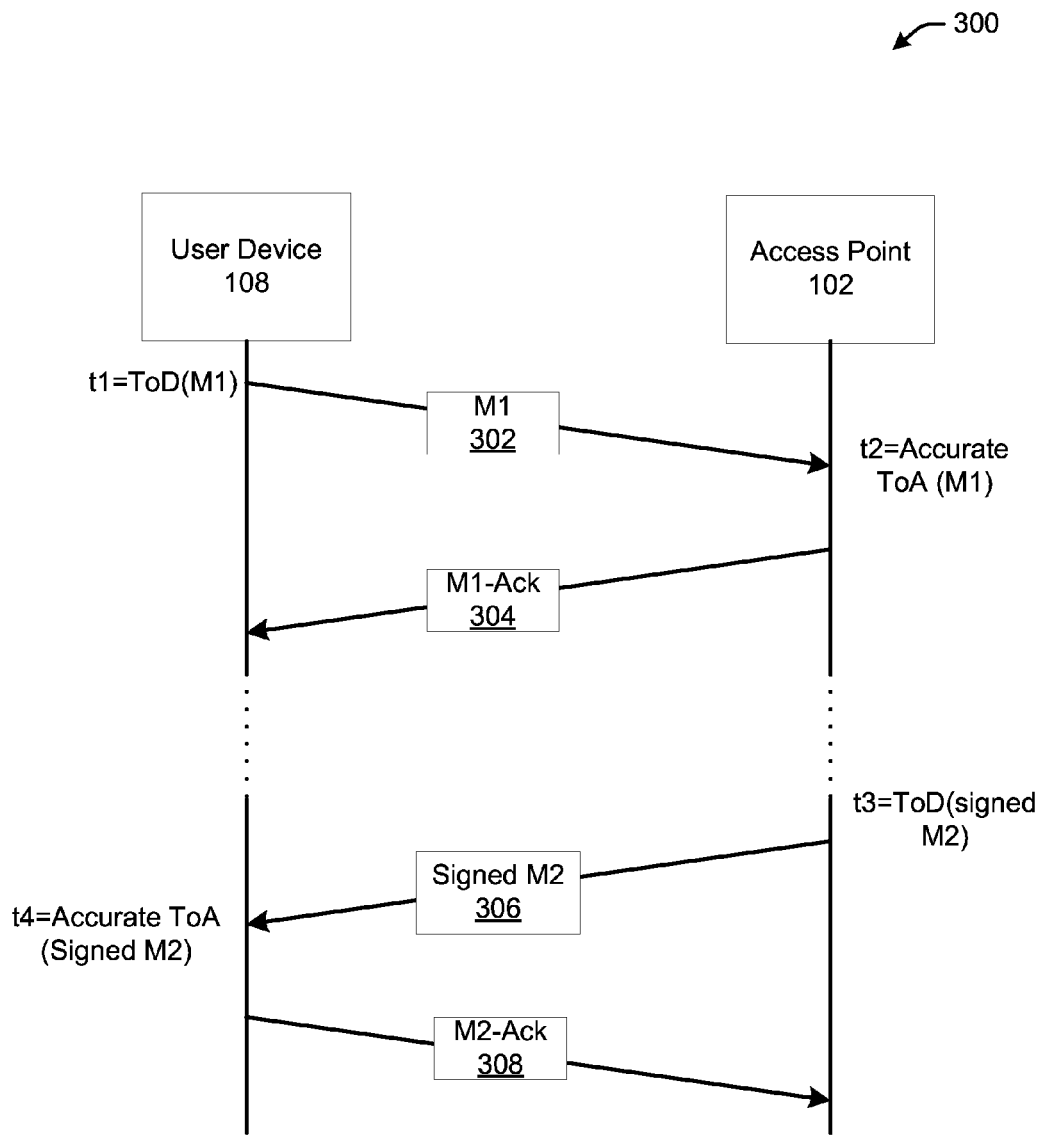
FIG. 3 is diagram of an illustrative time-of-flight measurement protocol for an authenticated time-of-flight indoor positioning system in accordance with one or more embodiments of the disclosure.

FIG. 3 is diagram of an illustrative time-of-flight measurement protocol for an authenticated time-of-flight indoor positioning system in accordance with one or more embodiments of the disclosure. FIG. 3 depicts the exchange of fine time measurement messages between a user device 108 and an access point 102. In some embodiments, the ToF measurement protocol may be a fine timing, measurement protocol. A fine timing measurement protocol may allow a user device 108 to accurately measure the round trip time between the user device 108 and an access point 102. With the regular transfer of fine timing measurement frames (e.g., fine timing measurement messages), it may be possible for the user device 108 to track changes in its relative location to the one or more access point(s) 102 in the coverage area provided by the authenticated ToF IPS. For example, a user device 108 may initiate a ToF measurement protocol. The user device 108 may generate a fine timing to frame, M1 302, to an access point 102. The user device 108 may record t1, which may be the time of departure of M1 302. M1 may comprise a token. In some embodiments, the token may be a randomly-generated number. The access point 102 may receive M1 302 and record t2, which may be the time of arrival of M1. The access point 102 may then transmit an acknowledgement frame, M1-Ack 304 back to the user device 108.

The access point 102 may then generate a response fine timing measurement frame, signed M2 306. The signed M2 306 may include the token or any pre-define derivative of the token. The message M2 306 may be signed by the access point 102 using a private key. In some embodiments, the message M2 306 may include a digital signature associated with the access point 102 based at least in part on the private key received from the ToF security server 106. The private key may have been generated by the ToF security server 106 and received by the access point 102 over a secure connection. The access point 102 may also include a timer and/or timestamp indicating the difference of time between t3 and t2, where t3 is the time of departure of M2 306.

The user device 108 may receive the signed M2 306 and record t4, which may be the accurate time of arrival of signed M2 306. The user device 108 may verify the message M2 306 using the public key received from the ToF security server 106. The user device 108 may then generate and transmit an acknowledgement frame, M2-Ack 308 hack to the access point 102. The ToF measurement module 246 of the user device 108 may determine a location of the user device 108 based at least in part on t1, t2, t3 and/or t4 as well as location information associated with one or more access points with which the user device 108 exchanged ToF messages.

Illustrative Processes

Figure 4:
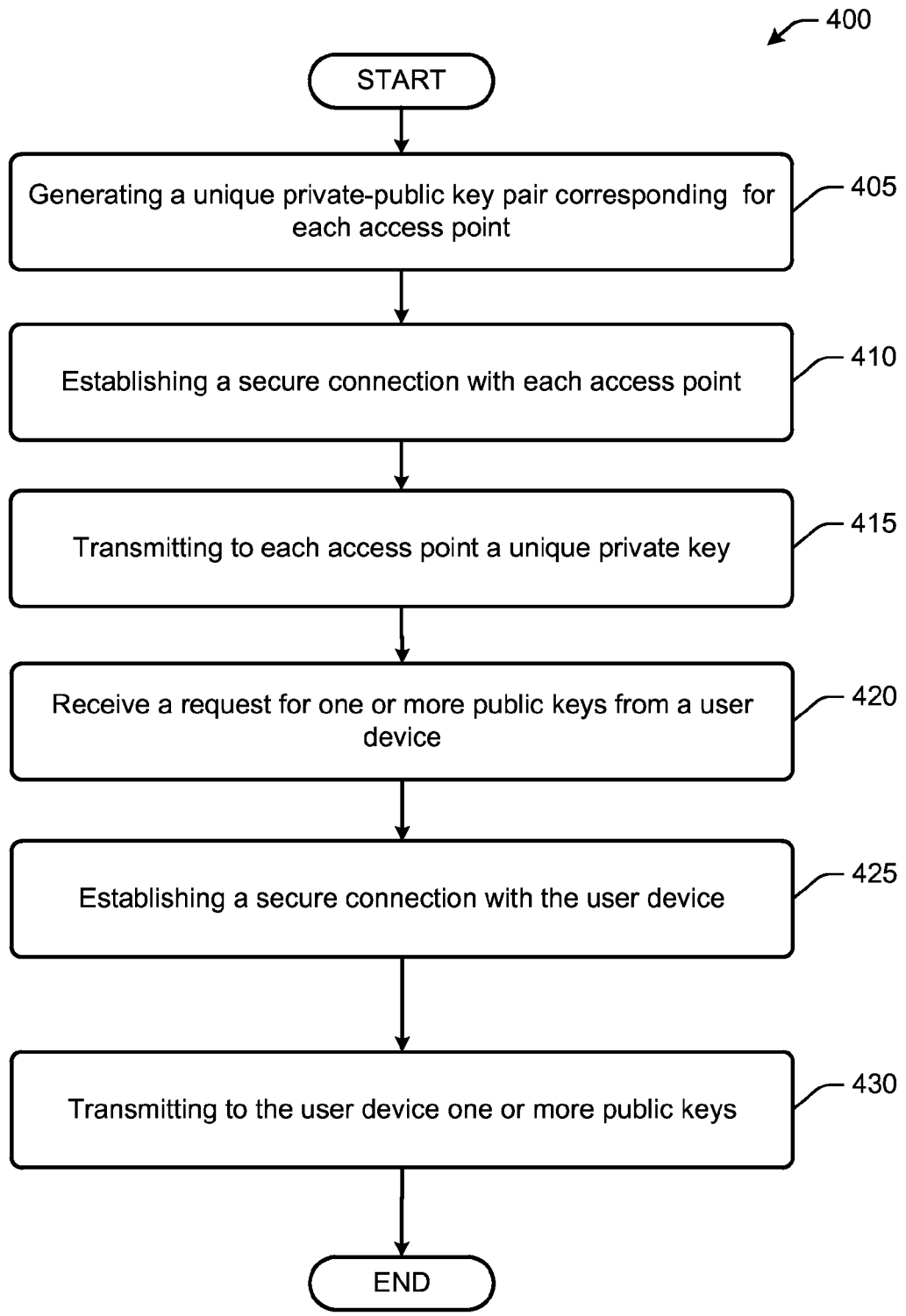
FIG. 4 is a process flow diagram of an illustrative method for secret key generation and exchange for access points and user devices in an authenticated time-of-flight indoor positioning system in accordance with one or more embodiments of the disclosure.

FIG. 4 is a process flow diagram of an illustrative method 400 for secret key generation and exchange for access points 102 and user devices 108 in an authenticated time-of-flight indoor positioning system in accordance with one or more embodiments of the disclosure. At block 405, the ToF security server 106 may generate a unique public-private key pairing for each access point 102 in the authenticated ToF IPS. In some embodiments, the key generation module 266 of the ToF security server 106 may generate the unique public-private secret key pairing. The key generation module 266 may generate the unique public-private key pairing based at least in part on the identity of the access point 102 for which the secret key pairing is being generated. For example, the key generation module 266 may use a MAC address and/or BSSID associated with the access point 102 to generate the public-private secret key pairing. In some embodiments, the public-private secret-key pairings may expire after a pre-determined time period. The pre-determined time period may be set by an operator of the network. The key generation module 266 may generate new unique public-private secret-key pairings for each active access point 102 in the authenticate ToF IPS.

At block 410, the ToF security server 106 may establish a secure connection with each access point 102 of the authenticated ToF IPS. In some embodiments, the secure connection may be a secured socket, HTTPS, TLS/SSL, or the like. The management module 268 of the ToF security server 106 may establish a connection with the access point 102.

At block 415, the ToF security server 106 may transfer a unique private key to each of the access points 102 in the authenticated ToF IPS. In some embodiments, the management module 268 may transmit the unique private key associated with the access point 102 to the access point 102. The access point 102 may use the private key to generate a digital signature to include in messages and/or ToF measurement protocol frames (e.g., fine timing management frames).

At block 420, the ToF security server 106 may receive a request for one or more public keys from a user device 108. The ToF security server 106 may act as a certificate authority within the authenticated ToF IPS. At block 425, the ToF security server 106 may establish a secure connection with the user device 108. The secure connection may be any type of secure connection as described herein. At block 430, the ToF security server 106 may transfer one or more public keys to the user device 108. In some embodiments, the ToF security server 106 may be a certificate authority in the authenticated ToF IPS. As a certificate authority, the ToF security server 106 may issue digital certificates. The digital certificates may include a public key previously generated by the key generation module 266 and associated with an access point 102 of the authenticated ToF IPS. The user device 108 may use the certificate to verify messages received by the user device 108 that include a digital signature with a private key.

Figure 5:
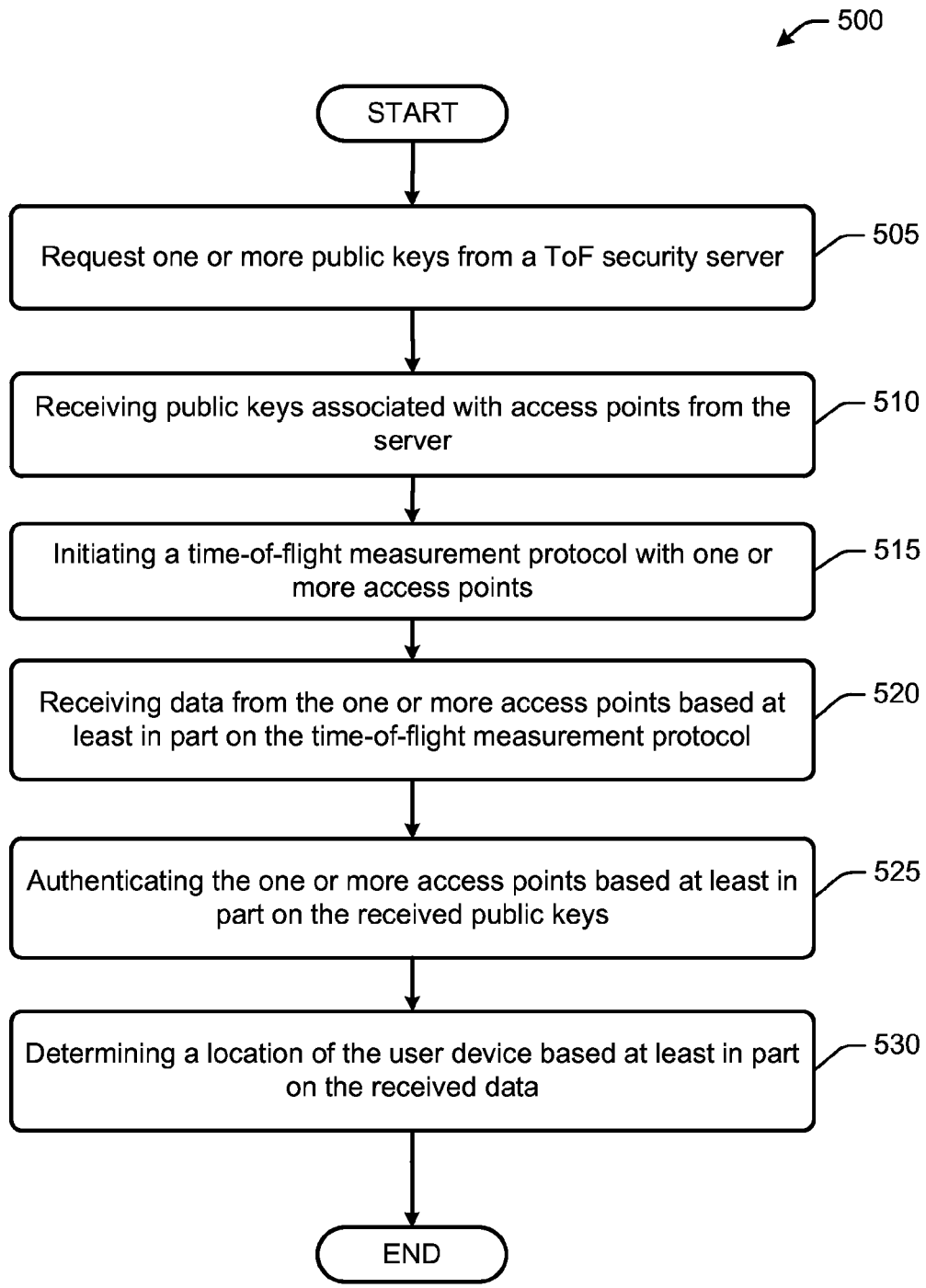
FIG. 5 is a process flow diagram of an illustrative method for establishing an authenticated location in an authenticated time-of-flight indoor positioning system in accordance with one or more embodiments of the disclosure.

FIG. 5 is a process flow diagram of an illustrative method 500 for establishing an authenticated location of a user device 108 in an authenticated time-of-flight indoor positioning system in accordance with one or more embodiments of the disclosure. At block 505, a user device 108 may request one or more public keys from a ToF security server 106. The ToF security server 106 may be a certificate authority and may manage the transmission of public and private keys to access points 102 and/or user devices 108.

At block 510, the user device 108 may receive the one or more public keys front the ToF security server 106. In some embodiments, the management module 268 may generate a digital certificate based at least in pan on a public key. The management module 268 may transmit one or more digital certificates to the user device 108 in response to receiving the request from the user device 108.

At block 515, the user device 108 may initiate a ToF measurement protocol with one or more access points 102. In some embodiments, the ToF measurement module 248 may initiate a ToF measurement protocol with one or more access points 102 at substantially the same time. In some embodiments, the ToF measurement module 246 may initiate a ToF measurement protocol with one or more access points 102 sequentially.

At block 520, the user device 108 may receive data from the one or more access points 102 generated by the ToF measurement protocol. The ToF measurement protocol may transmit and/or receive ToF measurement frames (e.g., messages) with an access point 102. The ToF measurement protocol may record various timing events, such as departure times of ToF measurement frames and/or time of arrivals of ToF measurement frames from one or more access points 102. The ToF measurement module 246 may calculate different measurements based at least in part on the recorded timing events. The ToF measurement module 246 may receive messages and identify one or more digital signatures that require authentication and/or verification. The ToF measurement module 246 may identify one or more timers, timestamps, and/or tokens (or derivations of tokens) from the received messages from the access points 102. For example, the ToF measurement module 246 may identify and/or determine a time of departure of a first message originating from the user device 108, a time of arrival of the first message at an access point 102, a time of departure of a second message originating from the access point 102, and a time of arrival of the second message at the user device 108. The ToF measurement module 246 may also securely receive or otherwise obtain location information, such as from a server, where the location information is associated with one or more access points 102 with which the user device 108 exchanged ToF messages. At block 525, the user device 108 may authenticate the one or more access points based at least in part on the received public keys. The authentication module 248 of a user device 248 may receive the identified digital signatures in received messages from one or more user access points 102. The authentication module 248 may verify and/or authenticate the digital signatures from the received messages from the access points 102 based at least in part on the public keys and/or digital certificates received from the ToF security server 106. In some embodiments, the authentication module 248 may determine a public key and/or digital certificate does not exist on the user device 108 to be used for authentication and/or verification and may communicate with the ToF security server 106 to obtain the public key and/or digital certificate for the access point 102 from which the messages and/or digital signature was received.

At block 530, the user device 108 may determine a location of the user device 108 based at least in part on the received data. In some embodiments, the ToF measurement module 246 may determine the location of the user device 108 using trilateration and/or multilateration. For example, the ToF measurement module 246 may measure the difference in distance extrapolated from the timing information received from the one or more access points 102. The ToF measurement module 268 may plot the possible locations forming a hyperbolic curve. To locate the exact location along that curve, a second measurement is taken from a different pair of access points 102 to produce a second curve, which may intersect with the first curve. When the two are compared, a small number of possible locations are revealed, producing an approximate location of the user device 108.

In some embodiments, the ToF measurement module 246 may determine a location of the user device 108 based at least in part on the time of departure time of departure of a first message originating from the user device 108, a time of arrival of the first message at an access point 102, a time of departure of a second message originating from the access point 102, and a time of arrival of the second message at the user device 108 as well as the location information associated with the one or more access points 102.

In one embodiment, a computer-readable medium may store computer-executable instructions which, when executed by a processor, cause the processor to perform operations, including receiving, from a server, a plurality of public keys via a secured network connection, wherein each of the plurality of public keys corresponds to a respective private key associated with an access point; initiating a time-of-flight (ToF) measurement protocol with one or more access points; receiving data generated by the ToF measurement protocol with the one or more access points; authenticating the one or more access points based at least in part on the plurality of public keys; and determining a location of a user device based at least in part on the received data.

In one aspect of an embodiment, authenticating the one or more access points based at least in part on the plurality of public keys may further comprise authenticating the one or more access points based at least in part on the plurality of public keys using a digital signature algorithm.

In one aspect of an embodiment, the ToF measurement protocol with the one or more access points may further comprise transmitting, to at least one of the one or more access points, a first message comprising a token; receiving, from the at least one of the one or more access points, a response to first the message; receiving, from the at least one of the one or more access points, a second message signed using a private key associated with the at least one of the one or more access points and corresponding to a public key of the plurality of public keys, the second message comprising the token and at least one timer, wherein the at least one timer indicates at least one of a time of arrival of the first message, a time of departure of the second message, or a difference between a time of departure of the second message and a time of arrival of the first message; and transmitting, to the at least one of the one or more access points, a response to the second message.

In one aspect of an embodiment, the second message may be the same as the response to the first message.

In one aspect of an embodiment, the token may comprise a randomly-generated number.

In one aspect of an embodiment, the private key may be generated by a server.

In one aspect of an embodiment, determining the location of the user device may further comprise determining a distance between the user device and the one or more access points based at least in part on the data generated by the ToF measurement protocol with the one or more access points; and determining the location of the user device based at least in part on the distance between the user device and the one or more access points and the location of the one or more access points, wherein the location of the one or more access points is obtained securely by the user device.

In one aspect of an embodiment, determining the location of the user device may further comprise determining the location of the user device based at least in part on the at least one tinier, a time of departure of the first message, the time of arrival of the first message, the time of departure of the second message, and a time of arrival of the second message.

In another embodiment, a computer-implemented method may be provided. The computer-implemented method may include receiving, by a user device comprising one or more processors, from a server, a plurality of public keys via a secured network connection, wherein each of the plurality of public keys corresponds to a respective private key associated with an access point; initiating, by the user device, a time-of-flight (ToF) measurement protocol with one or more access points; receiving, by the user device, data generated by the ToF measurement protocol with the one or more access points; authenticating, by the user device, the one or more access points based at least in part on the plurality of public keys; and determining, by the user device, a location of the user device based at least in part on the received data.

In one aspect of an embodiment, authenticating the one or more access points based at least in part on the plurality of public keys may further comprise authenticating the one or more access points based at least in part on the plurality of public keys using a digital signature algorithm.

In one aspect of an embodiment, the ToF measurement protocol with the one or more access points may further comprise transmitting, to at least one of the one or more access points, a first message comprising a token; receiving, from the at least one of the one or more access points, a response to first the message; receiving, from the at least one of the one or more access points, a second message signed using a private key associated with the at least one of the one or more access points and corresponding to a public key of the plurality of public keys, the second message comprising the token and at least one timer, wherein the at least one timer indicates at least one of a time of arrival of the first message, a dine of departure of the second message, or a difference between a time of departure of the second message and a time of arrival of the first message; and transmitting, to the at least one of the one or more access points, at response to the second message.

In one aspect of embodiment, the second message may be the same as the response to the first message.

In one aspect of an embodiment, the token may comprise a randomly-generated number.

In one aspect of an embodiment, the private key may be generated by a server.

In one aspect of an embodiment, determining the location of the user device may further comprise determining a distance between the user device and the one or more access points based at least in part on the data generated by the ToF measurement protocol with the one or more access points; and determining the location of the user device based at least in part on the distance between the use device and the one or more access points and the location of the one or more access points, wherein the location of the one or more access points is obtained securely by the user device.

In one aspect of an embodiment, determining the location of the user device may further comprise determining the location of the user device based at least in part on the at least one timer, a time of departure of the first message, the time of arrival of the first message, the time of departure of the second message, and a time of arrival of the second message.

In another embodiment, a system may be provided. The system may include at least one antenna; at least on transceiver; at least one memory storing computer executable instructions; and at least one processor, wherein the at least one processor is configured to access the at least one memory and to execute the computer executable instructions to: receive, from a server, a plurality of public keys via a secured network connection, wherein each of the plurality of public keys corresponds to a respective private key a associated with an access point; initiate a time-of-flight (ToF) measurement protocol with one or more access points; receive data generated by the ToF measurement protocol with the one or more access points; authenticate the one or more access points based at least in part on the plurality of public keys; and determine a location of a user device based at least in part on the received data.

In one aspect of an embodiment, to authenticate the one or more access points based at least in part on the plurality of public keys, the at least one processor may be configured to access the at least one memory and to execute the computer-executable instructions to authenticate the one or more access points based at least in part on the plurality of public keys using a digital signature algorithm.

In one aspect of an embodiment, the ToF measurement protocol with the one or more access points may further include operations to transmit, to at least one of the one or more access points, a first message comprising a token; receive, from the at least one of the one or more access points, a response to the first message; receive, from the at least one of the one or more access points, a second message signed using a private key associated with the at least one of the one or more access points and corresponding to a public key of the plurality of public keys, the second message comprising the token and at least one timer, wherein the at least one timer indicates a difference between a time of departure of the second message and a time of arrival of the first message; and transmit, to the at least one of the one or more access points, a response to the second message.

In one aspect of an embodiment, the second message may be the same as the response to the first message.

In one aspect of an embodiment, the token may comprise a randomly-generated number.

In one aspect of an embodiment, the private key may be generated by a server.

In one aspect of an embodiment, to determine the location of the user device, the at least one processor is configured to access the at least one memory and to execute the computer-executable instructions to determine a distance between the user device and the one or more access points based at least in part on the data generated by the ToF measurement protocol with the one or more access points; and determine the location of the user device based at least in part on the distance between the user device and the one or more access points and the location of the one or more access points, wherein the location of the one or more access points is obtained securely by the user device.

In one aspect of an embodiment, to determine the lunation of the user device, the at least one processor is configured to access the at least one memory and to execute the computer-executable instructions to determine the location of the user device based at least in part on the at least one timer, a time of departure of the first message, the time of arrival of the first message, the time of departure of the second message, and a time of arrival of the second message.

In another embodiment, an apparatus may be provided. The apparatus may include at least one antenna; at least on transceiver; at least one memory storing computer-executable instructions; and at least one processor, wherein the at least one processor is configured to access the at least one memory and to execute the computer-executable instructions to: receive, from a server, a plurality of public keys via a secured network connection, wherein each of the plurality of public keys corresponds to a respective private key associated with an access point; initiate a time-of-flight (ToF) measurement protocol with one or more access points; receive data generated by the ToF measurement protocol with the one or more access points; authenticate the one or more access points based at least in part on the plurality of public keys; and determine a location of a user device based at least in part on the received data.

In one aspect of art embodiment, to authenticate the one or more access points based at least in part on the plurality of public keys, the at least one processor may be configured to access the at least one memory and to execute the computer-executable instructions to authenticate the one or more access points based at least in part on the plurality of public keys using a digital signature algorithm.

In one aspect of an embodiment, the ToF measurement protocol with the one or more access points may further include operations to transmit, to at least one of the one or more access points, a first message comprising a token; receive, from the at least one of the one or more access points, a response to the first message; receive, from the at least one of the one or more access points, a second message signed using a private key associated with the at least one of the one or more access points and corresponding to a public key of the plurality of public keys, the second message comprising the token and at least one timer, wherein the at least one timer indicates a difference between a time of departure of the second message and a time arrival of the first message; and transmit, to the at least one of the one or more access points, a response to the second message.

In one aspect of an embodiment, the second message may be the same as the response to the first message.

In one aspect of an embodiment, the token may comprise a randomly-generated number.

In one aspect of an embodiment, the private key may be generated by a server.

In one aspect of an embodiment, to determine the location of the user device the at least one processor is configured to access the at least one memory and to execute the computer-executable instructions to determine a distance between the user device and the one or more access points based at least in part on the data generated by the ToF measurement protocol with the one or more access points; and determine the location of the user device based at least in part on the distance between the user device and the one or more access points and the location of the one or more access points, wherein the location of the one or more access points is obtained securely by the user device.

In one aspect of art embodiment, to determine the location of the user device, the at least one processor is configured to access the at least one memory and to execute the computer-executable instructions to determine the location of the user device based at least in part on the at least one timer, a time of departure of the first message, the time of arrival of the first message, the time of departure of the second message, and as time of arrival of the second message.

In another embodiment, a system may be provided. The system may include a means for receiving from a server, a plurality of public keys via a secured network connection, wherein each of the plurality of public keys corresponds to a respective private key associated with an access point; a means for initiating a time-of-flight (ToF) measurement protocol with one or more access points; a means for receiving data generated by the ToF measurement protocol with the one or more access points; a means for authenticating the one or more access points based at least in part on the plurality of public keys; and a means for determining a location of the user device based at least in part on the received data.

In one aspect of an embodiment, the means for authenticating the one or more access points based at least in part on the plurality of public keys may further comprise a means for authenticating the one or more access points based at least in part on the plurality of public keys using a digital signature algorithm.

In one aspect of an embodiment, the ToF measurement protocol with the one or more access points may further comprises a means for transmitting to at least one of the one or more access points, first a message comprising a token; a means for receiving from the at least one of the one or more access points, a response to the first message; a means for receiving from the at least one of the one or more access points, a second message signed using a private key associated with the at least one of the one or more access points and corresponding to a public key of the plurality of public keys, the second message comprising the token and at least one timer, wherein the at least one timer indicates a difference between a time of departure of the second message and a time of arrival of the first message; and a means for transmitting to the at least one of the one or more access points, a response to the second message.

In one aspect of an embodiment, the second message may be the same as the response to the first message.

In one aspect of an embodiment, the token may comprise a randomly-generated number.

In one aspect of an embodiment, the private key may be generated by a server.

In one aspect of an embodiment, determining the location of the user device may further comprise a means for determining a distance between the user device and the one or more access points based at least in part on the data generated by the ToF measurement protocol with the one or more access points; a means for determining the location of the user device based at least in part on the distance between the user device and the one or more access points and the location of the one or more access points, wherein the location of the one or more access points is obtained securely by the user device.

In one aspect of an embodiment, the means for determining the location of the user device may further comprise a means for determining the location of the user device based at least in part on the at least one timer, a time of departure of the first message, the time of arrival of the first message, the time of departure of the second message, and a time of arrival of the second message.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct it computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which causes a processor to execute the stored instructions to perform operations comprising:
   receiving, from a server, a plurality of public keys via a secured network connection, wherein each of the plurality of public keys corresponds to a respective private key associated with an access point;
   initiating a time of flight (ToF) measurement protocol with one or more access points by transmitting:
   to at least one first access point of the one or more access points a first message comprising a first token, and
   to at least one second access point of the one or more access points a third message comprising a second token;
   receiving at least one of a first acknowledgment message from the at least one first access point of the one or more access points, wherein the first acknowledgment message comprises an acknowledgment of the first message, and
   a third acknowledgment message from the at least one second access point of the one or more access points, wherein the third acknowledgment message comprises an acknowledgment of the third message;
   receiving a:
   second message, wherein the second message comprises the first token and at least one first timer, and the at least one first timer is based at least in part on a first difference between a time of departure of the second message, from the at least one first access point of the one or more access points, and a time of arrival of the first message at the at least one first access point of the one or more access points, and
   fourth message, wherein the fourth message comprises the second token and at least one second timer, and the at least one second timer is based at least in part on a second difference between a time of departure of the fourth message, from the at least one second access point of the one or more access points, and a time of arrival of the third message at the at least one second access point of the one or more access points:
   transmitting to:
   the first access point of the one or more access points a second acknowledgment message, wherein the second acknowledgment message comprises an acknowledgment of the second message, and
   the second access point of the one or more access points a fourth acknowledgment message, wherein the fourth acknowledgment message comprises an acknowledgment of the fourth message;
   authenticating the one or more access points based at least in part on the plurality of public keys;
   determining a:
   first curve of a first location of a user device based at least in part on first received data, wherein the first received data comprises the at least one first timer, the time of departure of the second message, the time of arrival of the first message, and a time of arrival of the second message, and
   second curve of a second location of the user device based at least in part on second received data, wherein the second received data comprises the at least one second timer, the time of departure of the fourth message, the time of arrival of the third message, and a time of arrival of the fourth message; and
   determining a location of the user device based at least in part on an intersection of the first curve and the second curve;
   wherein the second message is signed using a private key associated with the at least one of the one or more access points and corresponds to a public key of the plurality of public keys.

2. The non-transitory computer-readable medium of claim 1, wherein authenticating the one or more access points based at least in part on the plurality of public keys further comprises authenticating the one or more access points based at least in part on the plurality of public keys using a digital signature algorithm.

3. The non-transitory computer-readable medium of claim 1, wherein the second message is the same as the response to the first message.

4. The non-transitory computer-readable medium of claim 1, wherein the token comprises a randomly-generated number.

5. The non-transitory computer-readable medium of claim 1, wherein the private key is generated by a server.

6. The non-transitory computer readable medium of claim 1, wherein determining the location of the user device further comprises:
   determining the location of the user device based at least in part on the distance between the user device and the one or more access points and the location of the one or more access points, wherein the location of the one or more access points is obtained securely by the user device.

7. A computer-implemented method comprising:
receiving, by a user device comprising one or more processors, from a server, a plurality of public keys via a secured network connection, wherein each of the plurality of public keys corresponds to a respective private key associated with an access point;
initiating, by the user device, a time-of-flight (ToF) measurement protocol with one or more access points by transmitting:
to at least one first access point of the one or more access points a first message comprising a first token, and
to at least one second access point of the one or more access points a third message comprising a second token;
receiving at least one of:
a first acknowledgment message from the at least one first access point of the one or more access points, wherein the first acknowledgment message comprises an acknowledgment of the first message, and
a third acknowledgment message from the at least one second access point of the one or more access points, wherein the third acknowledgment message comprises an acknowledgment of the third message;
receiving, by the user device, a:
second message, wherein the second message comprises the first token and at least one first timer, and the at least one first timer is based at least in part on a first difference between a time of departure of the second message, from the at least one first access point of the one or more access points, and a time of arrival of the first message at the at least one first access point of the one or more access points, and
fourth message, wherein the fourth message comprises the second token and at least one second timer, and the at least one second timer is based at least in part on a second difference between the time of departure of the fourth message, from the at least one second access point of the one or more access points, and a time of arrival of the third message at the at least one second access point of the one or more access points;
transmitting to:
the first access point of the one or more access points a second acknowledgement message, wherein the second acknowledgement message comprises an acknowledgement of the second message, and
the second access point of the one or more access points a fourth acknowledgment message, wherein the fourth acknowledgment message comprises an acknowledgment of the fourth message;
authenticating, by the user device, the one or more access points based at least in part on the plurality of public keys; determining, by the user device, a first curve of a first location of the user device based at least in part on first received data, wherein the first received data comprises the at least one first timer, the time of departure of the second message, the time of arrival of the first message, and a time of arrival of the second message, and
second curve of a second location of the user device based at least in part on second received data, wherein the second received data comprises the at least one second timer, the time of departure of the fourth message, the time of arrival of the third message, and a time of arrival of the fourth message; and
determining a location of the user device based at least in part on an intersection of the first curve and the second curve;

wherein the second message is signed using a private key associated with the at least one of the one or more access points and corresponds to a public key of the plurality of public keys.

8. The computer-implemented method of claim 7, the method further comprising:
authenticating, by the user device, the one or more access points based at least in part on the plurality of public keys using a digital signature algorithm.

9. The computer-implemented method of claim 1, wherein the second message is the same as the response to the first message.

10. The computer-implemented method of claim 7, wherein the token comprises a randomly-generated number.

11. The computer-implemented method of claim 7, wherein the private key is generated by a server.

12. The computer-implemented method of claim 7, the method further comprising:
determining, by the user device, the location of the user device based at least in part on the distance between the user device and the one or more access points and the location of the one or more access points, wherein the location of the one or more access points is obtained securely by the user device.

13. A system comprising:
at least one antenna;
at least one transceiver;
at least one memory storing computer-executable instructions; and
at least one processor, wherein the at least one processor is configured to access the at least one memory and to execute the computer-executable instructions to:
receive, from a server, a plurality of public keys via a secured network connection, wherein each of the plurality of public keys corresponds to a respective private key associated with an access point;
initiate a time-of-flight (ToF) measurement protocol with one or more access points by transmitting:
to at least one first access point of the one or more access points a first message comprising a first token; and
to at least one second access point of the one or more access point a third message comprising a second token;
receive at least one:
a first acknowledgment message from the at least one first access point of the one or more access points, wherein the first acknowledgment message comprises an acknowledgment of the first message, and
a third acknowledgment message from the at least one second access point of the one or more access points, wherein the third acknowledgment message comprises an acknowledgment of the third message;
receive a:
second message, wherein the second message comprises the first token and at least one first timer, and the at least one first timer is based at least in part on a first difference between a time of departure of the second message, from the at least one first access point of the one or more access points, and a time of arrival of the first message at least the at least one first access point of the one or more access points, and
fourth message, wherein the fourth message comprises the second token and at least one second timer, and the at least one second timer is based at least in part on a second difference between a time or departure of the fourth message, from the at least one second access point of the one or more access points, and a time of arrival of the third message at the at least one second access point of the one or more access points;

transmit to the at least one:

first access point of the one or more access points a second acknowledgment message, wherein the second acknowledgment message comprises an acknowledgement of the second message, and second access point of the one or more access points a fourth acknowledgment message, wherein the fourth acknowledgment message comprises an acknowledgment of the fourth message, authenticate the one or more access points based at least in part on the plurality of public keys; determine a:

first curve of a first location of a user device based at least in part on first received data, wherein the first received data comprises the at least one first timer, the time of departure of the second message, the time of arrival of the first message, and a time of arrival of the second message, and second curve of a second location of the user device based at least in part on second received data, wherein the second received data comprises the at least one second timer, the time of departure of the fourth message, the time of arrival of the third message, and a time of arrival of the fourth message; and determine a location of the user device based at least in part on an intersection of the first curve and the second curve;

wherein the second message is signed using a private key associated with the at least one of the one or more access points and corresponds to a public key of the plurality of public keys.

14. The system of claim 13, wherein the at least one processor is further configured to access the at least one memory and to execute the computer-executable instructions to:

authenticate the one or more access points based at least in part on the plurality of public keys using a digital signature algorithm.

15. The system of claim 13, wherein the second message is the same as the response to the first message.

16. The system of claim 13, wherein the token comprises a randomly generated number.

17. The system of claim 13, wherein the private key is generated by a server.

18. The system of claim 13, wherein the at least one processor is configured to access the at least one memory and to execute the computer-executable instructions to:

determine the location of the user device based at least in part on the distance between the user device and the one or more access points and the location of the one or more access points, wherein the location of the one or more access points is obtained securely by the user devic

* * * * *